United States Patent
Shah

(10) Patent No.: US 7,280,828 B1
(45) Date of Patent: Oct. 9, 2007

(54) SERVICE GRANT FOR GSM WIRELESS NETWORKS BASED ON SIGNAL STRENGTH

(75) Inventor: Dipesh H. Shah, Fremont, CA (US)

(73) Assignee: Cingular Wireless II, LLC, Atlanta, GA (US)

( * ) Notice: Subject to any disclaimer, the term of this patent is extended or adjusted under 35 U.S.C. 154(b) by 86 days.

(21) Appl. No.: 10/854,082

(22) Filed: May 24, 2004

(51) Int. Cl.
*H04Q 7/20* (2006.01)
(52) U.S. Cl. .............. 455/434; 455/34.1; 455/433; 455/509; 455/574; 455/440
(58) Field of Classification Search ............... 455/34, 455/509, 440, 433, 574, 34.1, 434
See application file for complete search history.

(56) References Cited

U.S. PATENT DOCUMENTS

| | | | | |
|---|---|---|---|---|
| 5,396,648 | A * | 3/1995 | Patsiokas et al. ........... | 455/509 |
| 5,839,071 | A * | 11/1998 | Johnson ....................... | 455/440 |
| 6,553,227 | B1 * | 4/2003 | Ho et al. ...................... | 455/433 |
| 2001/0034254 | A1 * | 10/2001 | Ranta ........................... | 455/574 |
| 2004/0110521 | A1 * | 6/2004 | Soldani et al. .............. | 455/509 |

* cited by examiner

*Primary Examiner*—Jean Gelin
*Assistant Examiner*—Pierre-Louis Desir
(74) *Attorney, Agent, or Firm*—Coulter C. Henry, Jr.; Parks Knowlton LLC; Paul E. Knowlton, Esq.

(57) ABSTRACT

A system and method for selectively granting access to GSM wireless service based upon signal strength is provided. A base station may measure uplink signal strengths of bursts transmitted by a mobile station on a RACH, a SDCCH, or a TCH, and determine downlink signal strengths as conveyed by the mobile station on a SACCH allocated with the SDCCH or TCH. The base station is configured to compare the uplink signal strengths of the RACH, SDCCH, or TCH bursts with uplink signal thresholds to determine service access. In addition, the base station is further configured to compare the downlink signal strength of a BCCH, as reported by the mobile station on the SACCH, with downlink signal thresholds associated with the service request types conveyed by the SDCCH/TCH bursts. The base station then determines service access for a service request type based upon those comparisons.

18 Claims, 3 Drawing Sheets

SERVICE GRANT FOR GSM WIRELESS NETWORKS BASED ON SIGNAL STRENGTH

BACKGROUND OF THE INVENTION

1. Field of the Invention

This invention relates generally to wireless networks and more particularly to a system and method for granting service on GSM wireless networks.

2. Description of the Background Art

Global System for Mobile Communication (GSM) networks have become widely used in commercial wireless telecommunications systems, such as cellular and Personal Communications System (PCS) systems. FIG. 1 is a prior art block diagram of an exemplary GSM network 100. The GSM network 100 includes a gateway mobile switching center (GMSC) 110, a database 120, and one or more mobile switching centers (MSCs) 130. MSCs 130 have access to visitor's locator registers (VLRs) 140 and control base station systems (BSSs) 150. For example, a MSC 130a has access to a VLR 140a, and the MSC 130a controls BSSs 150a1 and 150a2. In operation, for example, the GSM network 100 may retrieve and update information stored in the database 120 and the VLR 140a to enable a mobile station 160 to communicate with a user of an external network (not shown) via the BSS 150a1, the MSC 130a, and the GMSC 110. The external network may comprise a Public Switched Telephone Network (PSTN), an Integrated Services Digital Network (ISDN), or other external voice and data networks, for example. Alternatively, the GSM network 100 may retrieve and update information stored in the database 120, the VLR 140a, and a VLR 140c to enable the mobile station (MS) 160 to communicate with an MS 170 via the BSS 150a1, the MSC 130a, a MSC 130c, and a BSS 150c1.

BSS 150a1 includes a base station controller (BSC) 180 and one or more base transceiver stations (BTSs) 190, also referred to as base stations (BSs). The BSs 190 are equipped with transceivers, signal processing hardware and software, and antennae 195 for communicating with mobile stations (such as MS 160). A BTS 190a, for example, communicates with the mobile stations located within a cell (or sector or other portion thereof) defined by the effective range of the BTS 190a. BSC 180 controls and manages operation of the BTSs 190 via control signals. In addition, BSC 180 routes and/or processes voice and data signals received from the MSC 130a to a BTS 190c that services coverage area in which the MS 160 is located. Similarly, BSC 180 routes voice and data signals received from a BTS 190b, for example, to the MSC 130a for further processing and transmission.

GSM systems use predefined signal level thresholds (camping parameters) to determine whether a mobile station (such as mobile station 160) is allowed to camp on a broadcast control channel associated with a BTS. Setting these thresholds involves consideration of competing factors. Setting the thresholds at relatively high values ensures that all of the MSs allowed to camp on the broadcast control channel will experience good voice call quality. However, doing so will exclude a greater number of MSs from access to the BTS, causing them to roam on competitors' or other non-preferred networks, or to receive a "No Service" notification. If the broadcast control channel signal thresholds are set at lower values, then a larger number of mobile stations may be able to camp on the broadcast control channel, but certain of the mobile stations may experience poor call quality for GSM services requiring relatively high signal strengths, such as voice calls. Typically, commercial GSM systems set the thresholds at appropriate levels to assure good voice call quality, causing the aforementioned problem of excluding access. It is noted that certain GSM services, such as Short Messaging Service (SMS), require significantly lower signal strengths than do voice calls. It would thus be desirable to provide a method and system that allows the GSM system operator to set camping parameters at values that are small enough to allow MSs that only require access to low-signal requirement GSM services to camp on a broadcast control channel, while guarding against poor voice call quality.

SUMMARY OF THE INVENTION

In accordance with embodiments of the present invention, a system and method is disclosed for selectively granting GSM service based on signal strength. For a mobile station camping on a broadcast control channel (BCCH), the method may comprise an initial step of receiving a first communication (typically in the form of an uplink RACH burst) transmitted by the mobile station on a common control channel (CCCH) and comparing a signal strength associated with the first communication with a first signal strength threshold. If the signal strength associated with the first communication is greater than or equal to the first signal strength threshold, the method proceeds to receiving a second communication (typically in the form of an SDCCH burst) identifying a service request type, determining a second signal strength threshold corresponding to the service request type and granting the service request type if a signal strength associated with the second communication is greater than or equal to the second signal strength threshold. In one embodiment, the second communication takes place after a base station system (BSS) sends an "immediate assignment" or an "immediate assignment extended" message to the mobile station in response to the first communication (i.e, in response to the uplink RACH burst).

In one embodiment, the signal strength associated with the first communication is an uplink signal strength. That is, the method involves measuring the signal strength of the first communication and comparing the measured uplink signal strength to a first uplink signal strength threshold. The first communication (e.g., the uplink RACH burst) may either be initiated by the mobile station or be sent responsive to a request originated at the base station, such as a paging response.

The signal strength associated with the second communication may represent either an uplink or downlink signal strength. The uplink signal strength technique involves measuring the signal strength of the second communication and comparing the measured uplink signal strength to a second uplink signal strength threshold corresponding to the service request type. The download signal strength technique involves extracting a downlink signal strength conveyed in the second communication and comparing the extracted downlink signal strength to a second downlink signal strength threshold corresponding to the service request type. In either case, the second signal strength threshold is selected from a stored set of signal thresholds, each threshold corresponding to an available service type that can be requested by the mobile station, such as short messaging service (SMS), location update, or voice call.

In a further embodiment, the method comprises executing one or more secondary GSM service granting procedures if the signal strength associated with the second communication is less than the second signal strength threshold associated with the service request type. If the signal strength associated with the RACH message on the CCCH is less than the first signal strength threshold, the RACH message is not processed.

A system for selectively granting GSM service according to an embodiment of the present invention comprises a base station configured to receive a communication from a mobile station identifying a service request type and selectively grant the service request based upon a signal strength associated with the communication and the service request type. The signal strength associated with the communication may be either the uplink strength, determined by measuring the received signal strength at the base station, or the downlink strength, which is encoded in the communication on the associated control channel (typically the SACCH (Slow Associated Control Channel)) and is based on a measurement of the signal strength received at the mobile station.

By utilizing the foregoing system and method, a GSM system operator may set BCCH camping parameters such that a mobile station is allowed to camp at a minimum possible signal strength (thereby avoiding "no service" conditions and roaming on competitor's or non-preferred networks), while inhibiting the mobile station's access to a requested service, such as a voice call, if the signal strength is too weak to provide adequate quality for the selected service.

DETAILED DESCRIPTION

Figure 1:
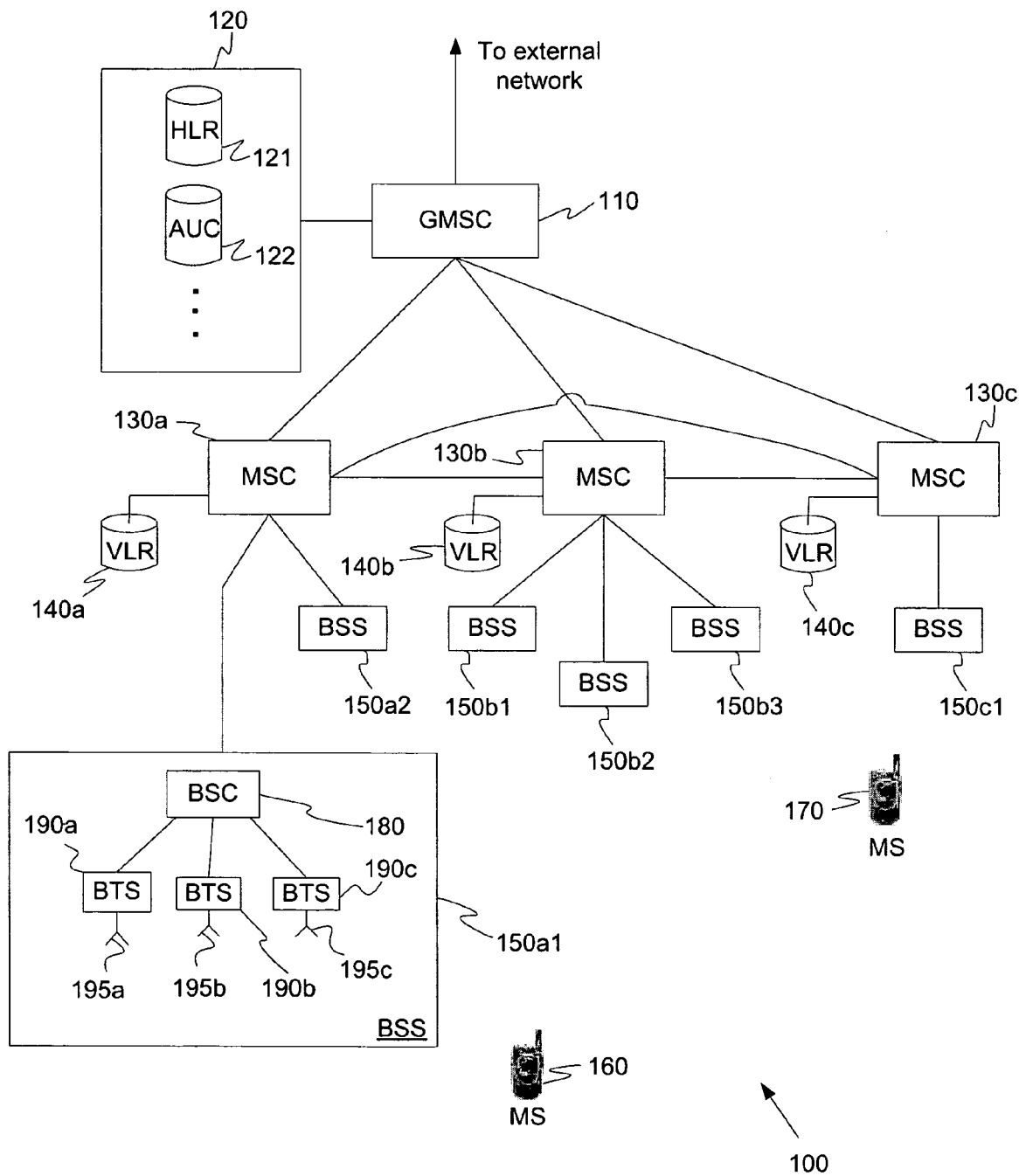
FIG. 1 is a block diagram of an exemplary GSM network in which an embodiment of the present invention may be implemented.
Figure 2:
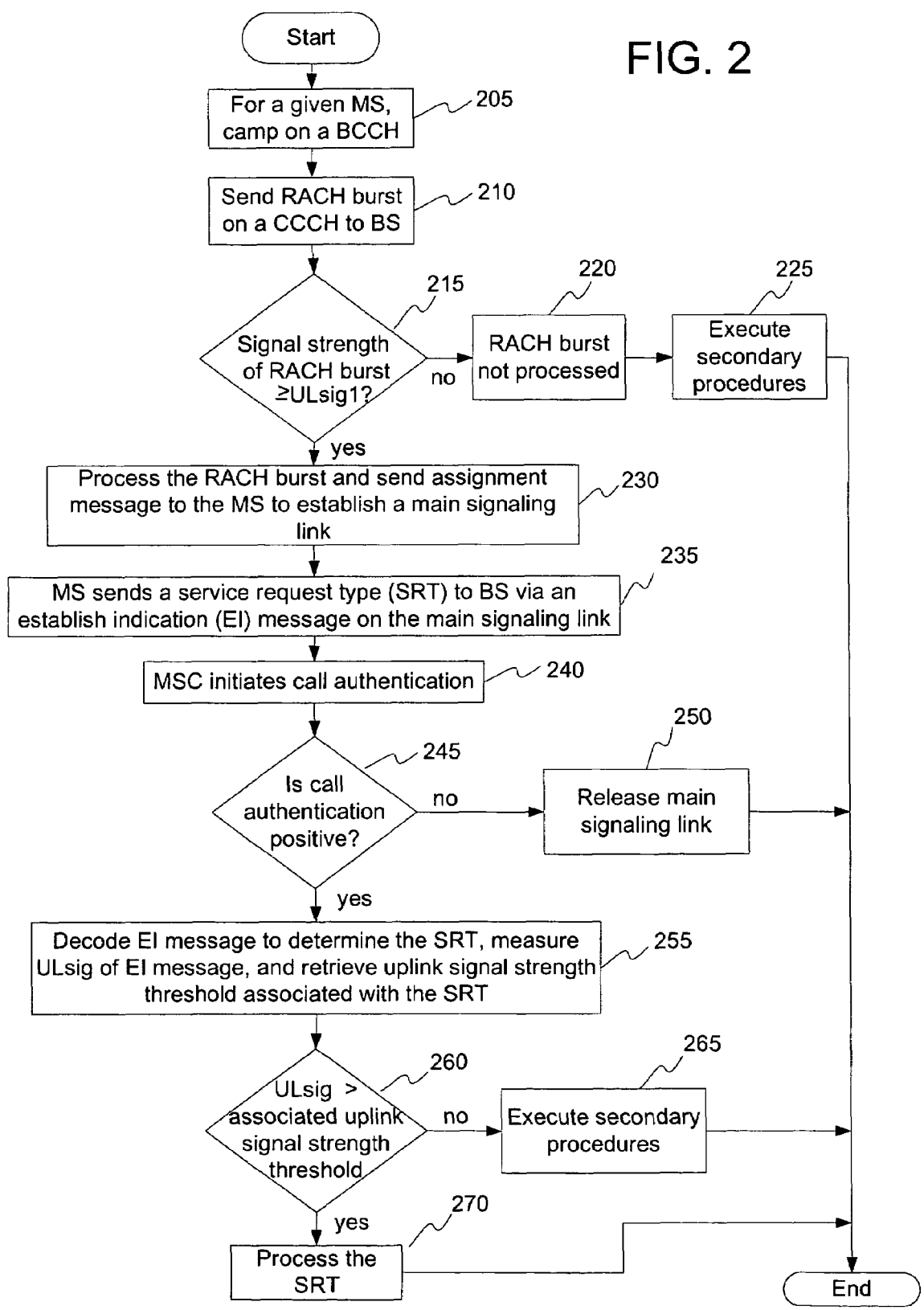
FIG. 2 is a flowchart of exemplary method steps for determining GSM service access based on uplink signal strength as received by a base station of a GSM network, according to one embodiment of the present invention.

FIG. 2 is an exemplary flowchart of method steps for selectively granting GSM service access based on uplink signal strength as received by a base station (for example, base station (BS) 190c depicted in FIG. 1) of a GSM network 100 (FIG. 1), according to one embodiment of the present invention. In step 205, a mobile station (for example, mobile station (MS) 160 illustrated in FIG. 1) selects a cell and camps on a broadcast control channel (BCCH) in accordance with predetermined cell selection criteria, such as the criteria specified under GSM protocols and described below. For example, mobile station 160 may attempt to select a cell by scanning a stored BCCH Allocation (BA) list if the list exists. Otherwise the MS 160 scans the whole frequency band and looks for suitable cells. The MS 160 uses a "path loss criterion" parameter C1 (also referred to as a camping parameter) to determine whether a cell is suitable to camp on. This path loss criterion parameter C1 is defined by GSM 03.22 as C1=(A−Max (B,0)), where A=Received Level Average−ACCMIN,
B=MS_TXPWR_MAX_CCH_P, and values are typically expressed in dBm. A cell is suitable to camp on when the path loss criterion parameter C1>0.

The MS 160 measures the Received Level Average on a BCCH. The averaging is based on at least five measurement samples per RF carrier, spread over a 3 to 5 second period. The measurement samples from different RF carriers are spread evenly during this period. The ACCMIN threshold is a minimum downlink signal strength received at the MS 160) required (designated as rxLevelAccess Min) for access to a BS associated with the BCCH. It is defined as a BTS parameter with a typical range of −110 dBm to −47 dBm.

MS_TXPWR_MAX_CCH is defined as a Maximum Transmit power level a mobile station may use when accessing an associated BTS on a common control channel (CCCH). P is defined as a Maximum RF output power of the mobile station.

Component A of the C1 criterion parameter represents the downlink path loss to a mobile station. If the downlink signal strength does not exceed the ACCMIN threshold, then C1 is negative and the mobile station does not select the cell to camp on. Thus a first condition for cell selection is good downlink connection to the mobile station.

Component Max (B, 0) of the C1 criterion parameter represents the uplink path from a mobile station. If a maximum mobile station power is greater than or equal to MS_TXPWR_MAX_CCH, then B is negative and Max (B,0) is zero. Therefore, the mobile station is capable of sending a strong access burst (i.e., the uplink connection is good), and C1 is not penalized. That is, C1 is equal to A. In contrast, when B is positive, B is subtracted from A to yield a smaller value for C1.

If a suitable cell is found, the MS camps on it (e.g., the MS 160 camps on the BS 190c). In the case of multiple suitable cells, the MS 160 selects a highest priority cell with the highest C1 value from a list of cells satisfying the C1 selection criterion. The MS 160 then registers in a location area of the selected cell.

At least two methods of searching for a suitable cell are available. In normal cell selection, the MS 160 has no prior knowledge of which RF channels are BCCH carriers. Therefore, the MS 160 searches at least 32 of the strongest RF channels in descending order of received signal strength to detect which channels are BCCH carriers. Subsequently, the first BCCH carrier found which is from a suitable cell (i.e., meets the camping criteria C1>0) is camped on. If no BCCH carriers are found, the MS 160 continues searching until at least one BCCH carrier is found.

In stored list cell selection, the MS 160 has a list of the BCCH carriers used by a Public Land Mobile Network (PLMN). This list is derived by the MS 160 from information gathered during previous selections of the PLMN. The MS searches the BCCH carriers on the list in a descending order of received signal level, and camps on the first BCCH carrier found from a suitable cell that meets the C1 camping criteria. The GSM network 100 preferably sets the ACCMIN threshold at a value such that the MS 160, when satisfying the path loss criterion C1, may access the least signal strength intensive service offered by the GSM network 100. By way of providing an example, we may assume that MS 160 camps on the broadcast carrier associated with BTS (BS) 190c depicted in FIG. 1.

Typically, individual services and/or control signals provided by the GSM network 100 require a specific minimum signal strength in order to meet quality standards for communications between the MS 160 and the BS 190c of the GSM network 100. For example, a required signal strength at the MS 160 of a page channel (PCH) burst transmitted by the BS 190c to alert the MS 160 of an incoming call is typically lower than a required signal strength at the MS 160 of a full rate traffic channel (TCH) burst comprising voice data. Examples of specific services or control signals that require relatively low signal strength to assure adequate quality include a PCH burst transmitted on downlink common control channel and a random access channel (RACH) burst transmitted on uplink common control channel to request a call set-up or to respond to paging messages.

In step 210, the MS 160 transmits a first communication to the BS 190c (typically in the form of a RACH burst on a common control channel (CCCH)). The RACH burst is employed to initiate a call, send short messages, initiate location updates, and respond to paging messages received from the BS 190c, etc. Typically, the RACH burst is transmitted in time slot zero of an uplink carrier, where the uplink carrier is part of an uplink/downlink carrier frequency pair.

In step 215, upon receiving the RACH burst, the BS 190c measures the signal strength of the received RACH burst, and compares the measured signal strength with a first uplink signal strength threshold ULsig1. For further descriptive purposes, signal strength of a burst transmitted by the MS 160 and received at the BS 190c and measured by the BS 190c is referred to as an uplink signal strength ULsig. If the uplink signal strength ULsig is less than the first uplink signal strength threshold ULsig1, then in step 220, the BS 190c takes no further action in processing the RACH burst (i.e., the request from the MS 160 is not acted upon).

If the RACH burst does not meet the uplink signal strength threshold, the GSM network 100 may optionally execute secondary procedures, as depicted in block 225. For example, in one embodiment of the invention, the BS 190c transmits one or more messages to the MS 160 via broadcast control channel (BCCH) bursts. The messages may, for example, inform the MS 160 that the call connection request cannot be granted, request that the MS 160 re-transmit the RACH burst at a higher power level, instruct the MS 160 to locate a broadcast control channel associated with a neighboring cell and re-transmit the RACH burst on an uplink carrier frequency associated with the newly located broadcast control channel, or instruct the MS 160 to locate a non-preferred provider's broadcast control channel to request the call set-up. Other secondary procedures executed by the GSM network 100 are within the scope of the present invention.

If, however, in step 215, the uplink signal strength ULsig is greater than or equal to the first uplink signal strength threshold ULsig1, then in step 230 the BS 190c processes the RACH burst. The BS 190c (or another component of the GSM network 100, such as the base station controller (BSC) 180 (FIG. 1) or the mobile switching center (MSC) 130a (FIG. 1)) typically assigns a stand-alone dedicated control channel (SDCCH) or a traffic channel (TCH) for subsequent control communications with the MS 160, by sending an "Immediate Assignment" or an "Immediate Assignment Extended" message to the MS 160 via an access granted channel (AGCH) burst. The assigned SDCCH or TCH may also be referred to as a main signaling link.

In step 235, upon receiving the "Immediate Assignment" or "Immediate Assignment Extended" message, the MS 160 sends an "Establish Indication" message to the BS 190c. Any message sent by the MS 160 in response to the "Immediate Assignment" or "Immediate Assignment Extended" message received by the MS 160 may be referred to as a second communication. The "Establish Indication" message identifies a service request type (SRT). The SRT may be, for example, a mobile-originated voice call request, a location update, a mobile originated SMS, an emergency call, or a response to a paging message, etc. The "Establish Indication" message will usually include additional information associated with the particular SRT, such as a calling number associated with the mobile-originated voice call request, for example. The BS 190c may then send one or more other messages to the MSC 130a to inform the MSC 130a of the request made by the MS 160, and to enable caller authentication.

If authentication is enabled, then in step 240 the MSC 130a initiates a call authentication procedure on the assigned SDCCH or TCH to determine if the MS 160 is an authorized subscriber of the GSM network 100. If, in step 245, the GSM network 100 determines that the MS 160 is not an authorized subscriber, then in step 250 the BS 190c releases the assigned SDCCH or TCH, and the method ends. It should be noted that call authentication procedures lie outside of the scope of the invention, but have been briefly described in the interest of completeness. In one embodiment of the invention, steps related to call authentication (i.e., steps 240, 245, and 250) are optional. Referring back to step 235, if the "Establish Indication" message transmitted by the MS 160 comprises a mobile-originated voice call request (i.e., a mobile station request for call setup), a TMSI (Temporary Mobile Station Identity) reallocation procedure may be initiated.

Next, in step 255, upon receiving the "Establish Indication" message, the BS 190c measures an uplink signal strength ULsig of the "Establish Indication" message transmitted by the MS 160, and decodes the message to determine the SRT. The BS 190c then retrieves an uplink signal strength threshold associated with the SRT, and in step 260, compares the uplink signal strength ULsig of the received SDCCH/TCH burst with the uplink signal strength threshold associated with the SRT. The BS 190c may include or otherwise access a memory or storage device that stores a set of predetermined uplink signal strength thresholds, each threshold corresponding to a specific SRT. For example, SRTs that are currently used in commercial GSM systems include an emergency call request, mobile-terminated and mobile-originated short message service (SMS) requests, a mobile station location update request, an IMSI detach request, circuit switched data calls, mobile-terminated and mobile-originated Full Rate [FR] voice call requests, mobile-terminated and mobile-originated Enhanced Full Rate [EFR] voice call requests, mobile-terminated and mobile-originated Adaptive MultiRate Full Rate [AMR-FR] voice call requests, mobile-terminated and mobile-originated Adaptive MultiRate Half Rate [AMR-HR] voice call requests, and mobile-terminated and mobile-originated Half Rate [HR] voice call requests. Each of these four voice call requests can be further classified in different SRT's such as mobile originated voice call and mobile terminated voice call. Thus, for example, mobile originated AMR-FR voice call can be one SRT and have the associated uplink signal strength threshold. In one embodiment of the invention, the BS memory stores a second uplink signal strength threshold (ULsig2) corresponding to the emergency call request, a third uplink signal strength threshold (ULsig3) corresponding to the mobile-originated SMS request, a fourth uplink signal strength threshold (ULsig4) corresponding to the mobile-terminated SMS request, a fifth uplink signal strength threshold (ULsig5) corresponding to the mobile station location update request, a sixth uplink signal strength threshold (ULsig6) corresponding to the IMSI detach request, a seventh uplink signal strength threshold (ULsig7) corresponding to the mobile-originated AMR-FR voice call request, an eighth uplink signal strength threshold (ULsig8) corresponding to the mobile-terminated AMR-FR voice call request, a ninth uplink signal strength threshold (ULsig9) corresponding to the mobile-originated FR voice call request, a tenth uplink signal strength threshold (ULsig10) corresponding to the mobile-terminated FR voice call request, an eleventh uplink signal strength threshold (ULsig11) corresponding to the mobile-originated FR voice call request, a twelfth uplink signal strength threshold (ULsig12) corresponding to the mobile-terminated FR voice call request, a thirteenth uplink signal strength threshold (ULsig13) corresponding to the mobile-originated AMR-HR voice call request, a fourteenth uplink signal strength threshold (ULsig14) corresponding to the mobile-terminated AMR-HR voice call request, a fifteenth uplink signal strength threshold (ULsig15) corresponding to the mobile-originated half rate voice call request, and a sixteenth uplink signal strength threshold (ULsig16) corresponding to the mobile-terminated half rate voice call request.

If, in step 260, the BS 190c determines that the uplink signal strength ULsig of the received SDCCH/TCH burst is less than the uplink signal strength threshold corresponding to the SRT, then in optional step 265, the GSM network 100 may execute secondary procedures in response to the SRT requested by the MS 160. As an illustrative example, if the SRT is a mobile-originated SMS request, and if in step 260, the BS 190c determines that the uplink signal strength ULsig of the received SDCCH/TCH burst identifying the mobile-originated SMS request is less than the uplink signal strength threshold ULsig3, then in step 265, the GSM network 100 may utilize one or more secondary procedures to grant or deny the mobile-originated SMS request. For example, the BS 190c may transmit one or more messages to the MS 160 over the allocated SDCCH/TCH. The messages may, for example, (1) inform the MS 160 that the SMS request cannot be granted, (2) instruct the MS 160 to increase transmission power and re-transmit the SDCCH burst comprising the SMS request at the increased transmission power, (3) instruct the MS 160 to locate a broadcast control channel associated with a neighboring cell and re-transmit the SDCCH burst on an uplink carrier associated with the newly located broadcast control channel, or (4) instruct the MS 160 to locate a broadcast control channel of a non-preferred GSM service provider for transmitting the SMS request.

Referring back to step 260, if the BS 190c determines that the uplink signal strength ULsig of the received SDCCH/TCH burst is greater than or equal to the uplink signal strength threshold associated with the SRT, then in step 270 the BS 190c, typically in conjunction with the BSC 180 and the MSC 130a, processes the SRT request and assigns channels for voice and/or data communication as necessary. It should be noted that steps 215 and 260 can be performed by the BS 190c, the BSC 180, or the MSC 130a.

In one embodiment of the invention, the uplink signal strength thresholds described above satisfy the following relationship: ULsig1≦ULsig2≦ULsig3≦ULsig4≦ULsig5≦ULsig6≦ULsig7≦ULsig8≦ULsig9≦ULsig10≦ULsig11≦ULsig12≦ULsig13≦ULsig14≦ULsig15≦ULsig16. However, the present invention covers any values of uplink signal strength thresholds and any algebraic relationships between the uplink signal strength thresholds. In addition, the uplink signal strength thresholds may be defined in units of signal power or signal amplitude, or other units known in the art for measuring and comparing RF signals. Furthermore, the GSM network 100 (FIG. 1) may adjust the uplink signal strength thresholds from time to time to optimize various performance criteria.

Figure 3:
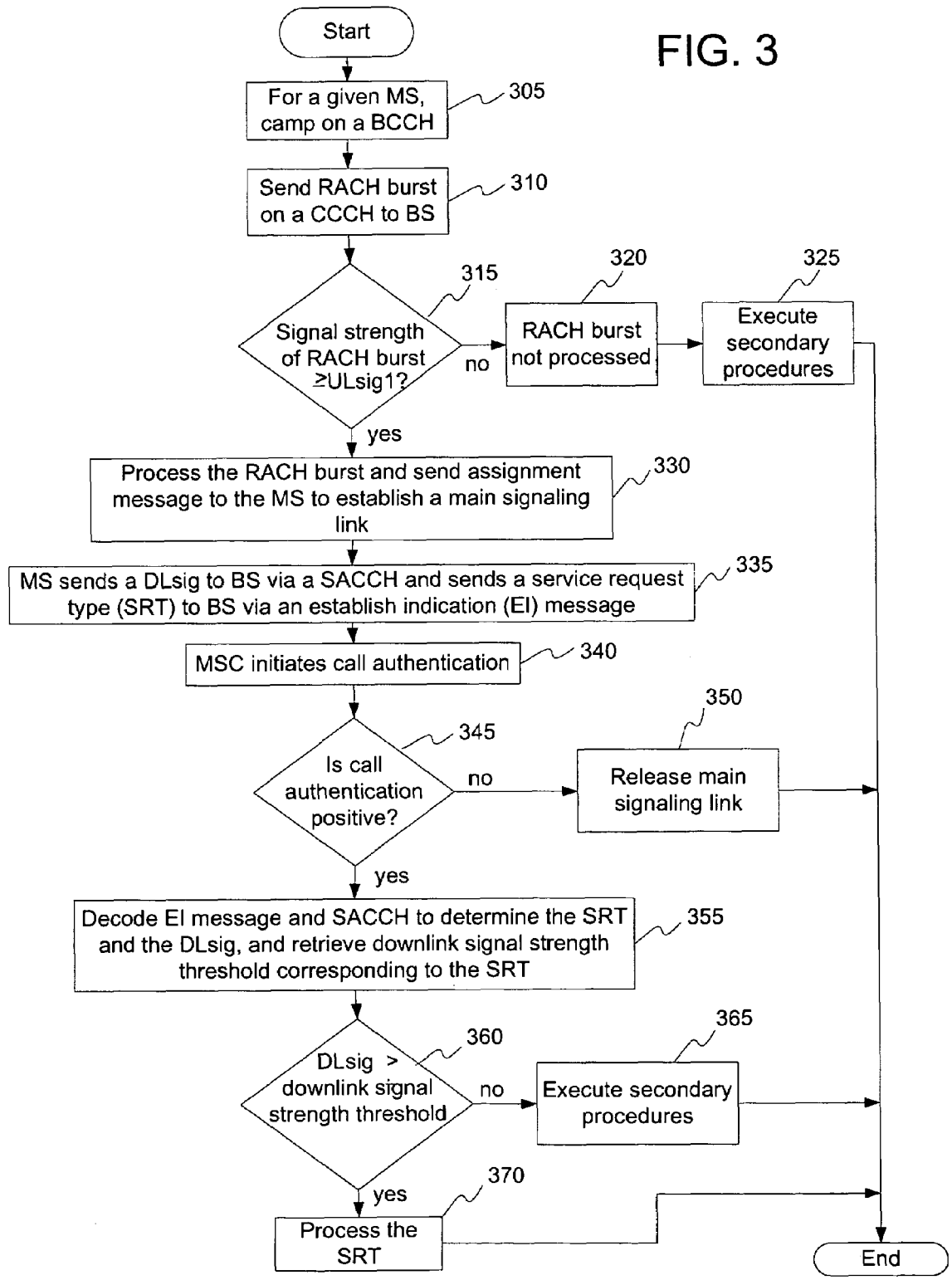
FIG. 3 is a flowchart of exemplary method steps for determining GSM service access based on downlink signal strength as received by a mobile station of a GSM network, according to one embodiment of the present invention.

FIG. 3 is an exemplary flowchart of method steps for determining GSM service access based on downlink signal strength as received by a MS (for example, MS 160 depicted in FIG. 1) of the GSM network 100 (FIG. 1), according to one embodiment of the present invention. Step 305 is substantially identical to step 205 (FIG. 2). For example, the MS 160 measures the downlink signal strengths of BCCHs, and camps on a BCCH associated with a base station (e.g., BS 190c) that meets the C1 camping criteria. While the MS 160 is in idle mode, it periodically performs downlink signal strength measurements of the BCCH it is camping on and neighbor BCCHs identified by the BS 190c.

Next, in step 310, the MS 160 transmits a first communication (typically a "Channel Request" on a RACH burst) to the BS 190c comprising a "Establishment Cause." In step 315, upon receiving and decoding the RACH burst from the MS 160, the BS 190c measures an uplink signal strength (Ulsig) of the RACH burst and compares the ULsig with a first uplink signal strength threshold ULsig1. If ULsig is less than the first uplink signal strength threshold ULsig1, then in step 320, the BS 190c takes no further action in processing the RACH burst. Optionally, in step 325, the GSM network 100 may execute secondary procedures similar to the secondary procedures described in step 225 (FIG. 2). If however, in step 315, ULsig is determined to be greater than or equal to the uplink signal strength threshold ULsig1, then the method continues at step 330.

In step 330, the BS 190c processes the RACH burst and establishes a main signaling link with the MS 160. For example, the MS 160 may be assigned SDCCH or TCH as the main signaling link via an "Immediate Assignment" or an "Immediate Assignment Extended" message from the BS 190c. The assigned SDCCH or TCH is allocated with a corresponding Slow Associated Control Channel (SACCH) used for reporting downlink signal strength measurements on the BCCH of a serving cell and on the BCCHs of all the specified neighbors of the serving cell. Typically, after a mobile station in a GSM system has received the "Immediate Assignment" or the "Immediate Assignment Extended" message and is assigned a main signaling link, the mobile station transmits to base stations information regarding downlink signal strength of the BCCH associated with the base station serving the mobile station, as measured by the mobile station. For example, the MS 160 measures the downlink signal strength of the BCCH associated with the accessed BS 190c, and reports the downlink signal strength every SACCH frame interval (i.e. every 480 msec).

Next, in step 335, the MS 160 reports the downlink signal strength DLsig of a previously received SDCCH burst or the BCCH associated with the serving BS 190c. The MS 160 also transmits another communication, generally an "Establish Indication" message, identifying service request type (SRT), where the SRT may be associated, for example, with a mobile-originated voice call request, a location update, a mobile-originated SMS, an emergency call, or a response to a paging message, etc. The MS burst, comprising the "Establish Indication" message, will usually include additional information associated with the particular SRT, such as a calling number associated with the mobile-originated voice call request, for example. The BS 190c may then send one or more other messages to the MSC 130a to inform the MSC 130a of the request made by the MS 160.

In one embodiment of the invention, the SACCH communication for reporting the downlink signal strength DLsig and the "Establish Indication" communication may collectively be referred to as a second communication. In addition, optional method steps 340-350 are substantially identical to method steps 240-250 of FIG. 2, and are not discussed in further detail.

Next, in step 355, the BS 190c receives and decodes the SACCH messages and "Establish Indication" message to obtain the DLsig and the SRT. The BS 190c then retrieves a downlink signal strength threshold corresponding to the SRT, and compares the DLsig with the downlink signal strength threshold corresponding to the SRT. The SRTs may be identical to the service request types described above in conjunction with FIG. 2. However, in the FIG. 3 embodiment of the invention, each SRT has a corresponding downlink signal strength threshold, rather than an uplink signal strength threshold employed in the method described above. For example, a BS memory (or BSC memory or MSC memory) may store a second downlink signal strength threshold (DLsig2) corresponding to an emergency call request, a third downlink signal strength threshold (DLsig3) corresponding to a mobile-originated SMS request, a fourth downlink signal strength threshold (DLsig4) corresponding to a mobile-terminated SMS request, a fifth downlink signal strength threshold (DLsig5) corresponding to a mobile station location update request, a sixth downlink signal strength threshold (DLsig6) corresponding to an IMSI detach request, a seventh downlink signal strength threshold (DLsig7) corresponding to the mobile-originated AMR-FR voice call request, an eighth downlink signal strength threshold (DLsig8) corresponding to the mobile-terminated AMR-FR voice call request, a ninth downlink signal strength threshold (DLsig9) corresponding to the mobile-originated EFR voice call request, a tenth downlink signal strength threshold (DLsig10) corresponding to the mobile-terminated EFR voice call request, an eleventh downlink signal strength threshold (DLsig11) corresponding to the mobile-originated FR voice call request, a twelfth downlink signal strength threshold (DLsig12) corresponding to the mobile-terminated FR voice call request, a thirteenth downlink signal strength threshold (DLsig13) corresponding to the mobile-originated AMR-HR voice call request, a fourteenth downlink signal strength threshold (DLsig14) corresponding to the mobile-terminated AMR-HR voice call request, a fifteenth downlink signal strength threshold (DLsig15) corresponding to the mobile-originated half rate voice call request, and a sixteenth downlink signal strength threshold (DLsig16) corresponding to the mobile-terminated half rate voice call request.

In step 360, if the BS 190c determines that DLsig is less than the downlink signal strength threshold corresponding to the SRT, then in optional step 365, the BS 190c executes secondary procedures identical to step 265 (FIG. 2). However, if in step 360 the BS 190c determines that DLsig is greater than or equal to the downlink signal strength threshold associated with the SRT, then in step 370 the BS 190c, typically in conjunction with the BSC 180 (FIG. 1 and the MSC 130a (FIG. 1), processes the SRT and assigns channels for voice and/or data communication, as necessary.

In one embodiment of the invention, the downlink signal strength thresholds described above satisfy the following relationship: DLsig1≦DLsig2≦DLsig3≦DLsig4≦DLsig5≦DLsig6≦DLsig7≦DLsig8≦DLsig9≦DLsig10≦DLsig11≦DLsig12≦DLsig13≦DLsig14≦DLsig15≦DLsig16. However, the present invention covers any values of downlink signal strength thresholds and any algebraic relationships between the downlink signal strength thresholds. In addition, the downlink signal strength thresholds may be defined in units of signal power or signal amplitude, or other units known in the art for measuring and comparing RF signals. Furthermore, the GSM network 100 (FIG. 1) may adjust the downlink signal strength thresholds from time to time to optimize various performance criteria.

The present invention has been described above with reference to exemplary embodiments. Other embodiments will be apparent to those skilled in the art in light of this disclosure. The present invention may readily be implemented using configurations other than those described in the exemplary embodiments above. For example, the present invention may be utilized in other mobile communication systems, such as paging systems, American AMPS (Advanced Mobile Phone System), English TACS (Total Access Cellular Systems), Scandinavian NMT (Nordic Mobile Telephone system), German C-Netz, IS-54/136 and IS-95 systems, wireless LAN's, and mobile satellite systems. Therefore, these and other variations upon the exemplary embodiments are covered by the present invention.

What is claimed is:

1. A method for selectively granting service in a GSM network, comprising:

receiving a first communication transmitted by a mobile station;

comparing a signal strength associated with the first communication with a first signal strength threshold;

if the signal strength associated with the first communication is at least equal to the first signal strength threshold, then processing the first communication and sending an assignment message to the mobile station for establishing and assigning a main signaling link, the main signaling link comprising a stand alone dedicated control channel or a traffic channel, and then receiving a second communication transmitted by the mobile station via the main signaling link, the second communication identifying a service request type (SRT);

decoding the second communication to determine the SRT and retrieving a second signal strength threshold;

granting the SRT if a signal strength associated with the second communication is at least equal to a the second signal strength threshold selected from a set of second signal strength thresholds, each one of the set of second signal strength thresholds corresponding to an available SRT, the signal strength comprising an uplink signal strength or a downlink signal strength, and wherein if the signal strength is an uplink signal strength, measuring signal strength of the second communication and comparing the measured uplink signal strength to second signal strength threshold corresponding to the SRT, and if the signal strength is a downlink signal strength, extracting the downlink signal strength conveyed by the second communication and comparing the extracted downlink signal strength to the second strength threshold corresponding to the SRT.

2. The method of claim 1, further comprising measuring signal strength of the first communication to obtain the signal strength associated with the first communication, and wherein the first signal strength threshold is a first uplink signal strength threshold.

3. The method of claim 1, wherein the first communication is a RACH burst.

4. The method of claim 1, wherein the first communication is a RACH burst transmitted in connection with a mobile-originated call set-up request.

5. The method of claim 1, wherein the first communication is a RACH burst transmitted in connection with a response to a paging message.

6. The method of claim 1, further comprising executing at least one secondary GSM service granting procedure if the signal strength associated with the first communication is less than the first signal strength threshold.

7. The method of claim 1, further comprising executing at least one secondary GSM service granting procedure if the signal strength associated with the second communication is less than the second signal strength threshold corresponding to the SRT.

8. The method of claim 7, wherein a first secondary GSM service granting procedure of the at least one secondary GSM service granting procedure instructs the mobile station to retransmit the second communication at a higher power level.

9. The method of claim 7, wherein a second secondary GSM service granting procedure of the at least one secondary GSM service granting procedure instructs the mobile station to locate a different broadcast carrier and retransmit the second communication on an uplink carrier frequency associated with the different broadcast carrier.

10. The method of claim 7, wherein a third secondary GSM service granting procedure of the at least one secondary GSM service granting procedure instructs the mobile station to handover to a SDCCH associated with a neighboring base station, and retransmit the second communication on an uplink carrier frequency associated with the SDCCH.

11. The method of claim 7, wherein a fourth secondary GSM service granting procedure of the at least one secondary GSM service granting procedure instructs the mobile station to handover to a TCH associated with a neighboring base station, and retransmit the second communication on an uplink carrier frequency associated with the TCH.

12. The method of claim 1, wherein the set of second signal strength thresholds includes a plurality of second signal strength thresholds, at least two of which are different.

13. The method of claim 1, wherein the set of second signal strength thresholds includes a plurality of second signal strength thresholds, at least two of which are equal.

14. The method of claim 1, wherein the set of second signal strength thresholds include a plurality of second signal strength thresholds, at least one of which is greater than the first signal strength threshold.

15. The method of claim 1, wherein the available SRTs comprise: a mobile-terminated short message service (SMS) request, a mobile-originated SMS request, a mobile station location update request, an IMAI detach request, a mobile-terminated voice call request, a response to a paging message, an emergency call, and a mobile-originated voice call request.

16. An electronic-readable medium having embodied thereon a program, the program being executable by a machine to perform a method for selectively granting service in a GSM network, the method comprising:
receiving a first communication transmitted by a mobile station;
comparing a signal strength associated with the first communication with a first signal strength threshold;
if the signal strength associated with the first communication is at least equal to the first signal strength threshold, then processing the first communication and sending an assignment message to the mobile station for establishing and assigning a main signaling link, the main signaling link comprising a stand alone dedicated control channel or a traffic channel, and then receiving a second communication transmitted by the mobile station via the main signaling link, the second communication identifying a service request type (SRT);
decoding the second communication to determine the SRT and retrieving a second signal strength threshold;
granting the SRT if a signal strength associated with the second communication is at least equal to the second signal strength threshold selected from a set of second signal strength thresholds, each one of the set of second signal strength thresholds corresponding to an available SRT, the signal strength comprising an uplink signal strength or a downlink signal strength, and wherein if the signal strength is an uplink signal strength, measuring signal strength of the second communication and comparing the measured uplink signal strength to second signal strength threshold corresponding to the SRT, and if the signal strength is a downlink signal strength, extracting the downlink signal strength conveyed by the second communication and comparing the extracted downlink signal strength to the second strength threshold corresponding to the SRT.

17. The medium of claim 16, further comprising executing at least one secondary GSM service granting procedure if the signal strength associated with the first communication is less than the first signal strength threshold or if the signal strength associated with the second communication is less than the second signal strength threshold corresponding to the SRT.

18. A system for selectively granting service in a GSM network, comprising:
means for receiving a first communication transmitted by a mobile station;
means for comparing a signal strength associated with the first communication with a first signal strength threshold;
means for processing the first communication and sending an assignment message to the mobile station;
means for assigning a main signaling link to receive a second communication transmitted by the mobile station if the signal strength associated with the first communication is at least equal to the first signal strength threshold, the second communication identifying a service request type (SRT), the main signaling link comprising a stand alone dedicated control channel or a traffic channel;
means for decoding the second communication to determine the SRT and retrieving a second signal strength threshold;
means for granting the SRT if a signal strength associated with the second communication is at least equal to a the second signal strength threshold selected from a set of second signal strength thresholds, each one of the set of second signal strength thresholds corresponding to an available SRT, the signal strength comprising an uplink signal strength or a downlink signal strength, and wherein if the signal strength is an uplink signal strength, measuring signal strength of the second communication and comparing the measured uplink signal strength to second signal strength threshold corresponding to the SRT, and if the signal strength is a downlink signal strength, extracting the downlink signal strength conveyed by the second communication and comparing the extracted downlink signal strength to the second strength threshold corresponding to the SRT.

* * * * *